United States Patent [19]

Pfefferle et al.

[11] Patent Number: 5,421,154
[45] Date of Patent: Jun. 6, 1995

[54] EXHAUST TEMPERATURE CONTROL

[76] Inventors: William C. Pfefferle, 51 Woodland Dr., Middletown, N.J. 07748; Dyland H. Hixon, 176 Beach Ave., East Haven, Conn. 06512

[21] Appl. No.: 83,355

[22] Filed: Jun. 28, 1993

Related U.S. Application Data

[63] Continuation-in-part of Ser. No. 918,250, Jul. 23, 1992.

[51] Int. Cl.⁶ ............................................. F01N 3/20
[52] U.S. Cl. ............................... 60/274; 60/299; 60/308; 60/319
[58] Field of Search ............ 60/308, 316, 317, 319, 60/299, 274

[56] References Cited

U.S. PATENT DOCUMENTS

| | | | |
|---|---|---|---|
| 3,285,709 | 11/1966 | Eannarino | 60/308 |
| 3,460,916 | 8/1969 | Aronsohn | 60/299 |
| 3,875,745 | 4/1975 | Franklin | 60/319 |
| 4,060,985 | 12/1977 | Fukushima | 60/319 |

*Primary Examiner*—Douglas Hart
*Attorney, Agent, or Firm*—Kane, Dalsimer, Sullivan, Kurucz, Levy, Eisele and Richard

[57] ABSTRACT

An emissions control system for rich-burn internal combustion engines, said control system comprising:
a. a reaction chamber for oxidation of exhaust gas fuel values,
b. passive means to utilize reaction chamber effluent flow energy to mix cooling air into reaction chamber effluent to lower the temperature of said effluent.
c. flame arrestor means to prevent ignition of flammable fuel-air mixtures external to the engine.

14 Claims, 1 Drawing Sheet

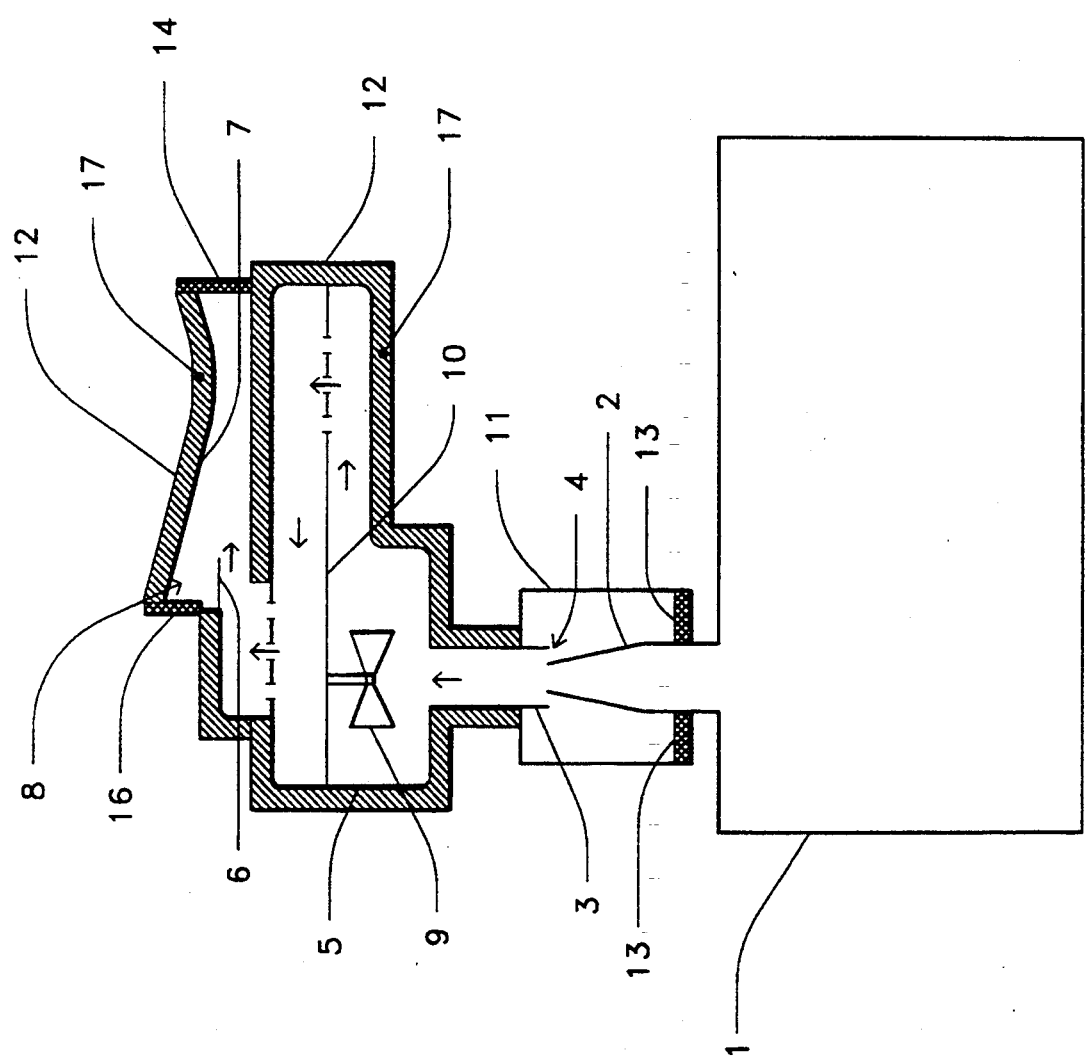

EXHAUST TEMPERATURE CONTROL

This invention is a continuation-in-part of copending U.S. patent application Ser. No. 918,250, filed on Jul. 23, 1992 and incorporated herein by reference thereto.

BACKGROUND OF THE INVENTION

1. Field of the Invention

This invention relates to improved systems for control of exhaust emissions of gases containing sufficient fuel values to generate high combustion temperatures. In one specific aspect the present invention relates to catalytic systems for control of exhaust emissions from internal combustion engines. More specifically, this invention relates to emissions control devices for fuel-rich internal combustion engines with very high reaction effluent tempeatures.

2. Brief Description of the Prior Art

Exhaust emissions from small internal combustion engines, such as are used for lawn mowers and small generator sets, are a significant source of atmospheric pollution by hydrocarbons and carbon monoxide. Such engines typically operate fuel-rich and therefore are particularly dirty as compared to an automotive engine, even without a catalytic converter. Although automotive emissions are now controlled by use of catalytic converters, such conventional devices are not considered feasible for small engine use because of inherently large size, high cost and system complexity relating to the need for air addition and to the need to limit the temperature of exhaust gases and exposed converter surfaces to safe values. The high emission levels of typical small engines means that destruction of those emissions results in a greater evolution of heat with a consequent higher converter temperature than for typical automotive catalytic converters. Further, small engine systems typically are much more exposed to gasoline spills and to operator contact, creating a hazard even with temperatures comparable to those for automotive catalytic converters. Effective means of suitable size and simplicity are thus required not only for the conversion reactor itself and for the addition and mixing of the air needed for oxidation of the exhaust fuel values to carbon dioxide and water but also for limiting temperatures to safe levels.

The present invention meets these needs by providing a passive system for dilution cooling of the hot effluent gases from engine emission control conversion devices.

SUMMARY OF THE INVENTION

Definition of Terms

As used in the present invention the term "passive" as applied to emissions control devices, systems or components thereof refers such devices or components which do not require moving parts for function. Thus a conventional catalytic converter is a passive device but a converter system utilizing a mechanical air pump for air addition is not passive.

The terms "carbonaceous pollutant" and "hydrocarbon" as used in the present invention not only refer to organic compounds, including conventional liquid and gaseous fuels, but also to gas streams containing fuel values in the form of compounds such as carbon monoxide, organic compounds or partial oxidation products of carbon containing compounds.

The Invention

It has now been found that the high exhaust temperatures resulting from oxidative control of emissions from internal combustion engines can be reduced to safe levels by using the kinetic energy of the high velocity pulses of the hot converter exhaust flow to induct and mix sufficient air into the hot reacted exhaust gases to dilute and cool the exhaust gases to a safe level for venting, and that ignition of any fumes in the ambient air prevented by use of flame arrestor screens protecting all openings connected with possible sources of ignition. This allows use of engines with the exhaust gas reactors of the present invention even in hazardous locations such as coal mines. Typically the temperature of the converter exhaust is reduced to a value no higher than about 600 degrees Kelvin for use in such hazardous locations. Converter exhaust temperature is advantageously reduced by at least about 200 degrees Kelvin.

Advantageously, gas phase combustion of a mixture of air and exhaust gases is catalytically stabilized by contact with a catalytic surface, as in the method of co-pending application Ser. No. 918,250 filed Jul. 23, 1992. Although catalytic stabilization offers smooth combustion over a wide range of operating conditions, it has been demonstrated that if the exhaust gas is hot enough and sufficiently fuel-rich, gas phase combustion can be stabilized with the backmixing of a conventional muffler even without catalytic stabilization. On the other hand, for engines which operate insufficiently fuel-rich even for catalytic stabilization of thermal combustion of the exhaust fuel values, the use of a catalytic reactor within the muffler allows for a high conversion level solely by virtue of heterogeneous reactions on the surface of a platinum metal or base metal catalyst, as with a conventional monolithic catalytic converter or a microlithic catalytic converter. Thus, the present invention makes possible economic achievement of ultra low emission levels of carbon monoxide and hydrocarbons even with very small internal combustion engines such as small two stroke engines.

In a preferred embodiment of the present invention, the engine exhaust is ducted through a nozzle attached to the engine and jetted into the open end of a duct thereby entraining through a flame arrestor sufficient air for oxidation of at least a major portion of the fuel values contained therein in a downstream reaction zone. The reacted and heated exhaust gases are then ducted through a second nozzle into a second duct thereby entraining, again through a flame arrestor, sufficient additional air to lower the effluent temperature to a level at least as low as that of the engine exhaust. Advantageously, the receiving ducts may be venturi shaped. Preferably, gas phase reactions are catalytically stabilized in a well mixed thermal reaction zone. The efficient, rapid thermal combustion which occurs is believed to result from the injection of heat and free radicals produced by the catalyst surface reactions at a rate sufficient to counter the quenching of free radicals which otherwise minimize thermal reaction even at combustion temperatures much higher than those found to be feasible in the method of the present invention.

BRIEF DESCRIPTION OF THE DRAWINGS

The FIGURE shows a schematic of a passive catalytically stabilized thermal reaction system for reduction of pollutants from a single cylinder gasoline engine.

DETAILED DESCRIPTION OF THE INVENTION AND PREFERRED EMBODIMENTS

The present invention is further described in connection with the drawings. As shown in the FIGURE, in one preferred embodiment the exhaust from a single cylinder gasoline engine 1 passes through exhaust line 2, which serves as an air inductor nozzle, into line 3 thereby entraining air from shroud 11 through opening 4 in line 3. Air enters shroud 11 through flame arrestor 13. The exhaust gas and the mixed in added air pass from line 3 into reactor/muffler 5 into contact with the catalytic surfaces of swirler 9 resulting in virgorous recirculation and stable gas phase combustion. Contact of gases with the catalytic surfaces of baffle plate 10 aid flame stabilization. Hot combustion products exiting vessel 5 are directed by deflector 6 which serves as an air inductor nozzle, into the venturi duct formed by wall 7 thereby inducting air into duct 8 through flame arrestor screen 16 and mixing it with the hot exhaust. Gases exiting through the venturi duct formed by wall 7 are more than 200 degrees Celsius lower in temperature than the hot gases exiting reactor/muffler 5. Contact of entering gases with swirler 9 also serves to create a low pressure region near the muffler inlet and thus inhibit backflow of gases through the open end of line 3. Typically, muffler 5 is encased in insulation 17 to reduce the temperature of surfaces 12 to an acceptable level. Gases exit the venturi formed by wall 7 through flame arrestor 14 to contain any flame from ignition of fuel in air entering through arrestor 16.

In place of the insulation, a double walled heat shield may be used to enclose the muffler assembly to contain the reaction heat and minimize risk of burns or fire.

EXAMPLE I

Fuel rich exhaust gas from a small Briggs and Stratton single cylinder gasoline powered spark ignition engine driving an electrical generator was passed through an exhaust pipe of conventional size discharging as an injector nozzle into a larger pipe and inducting air through the opening between the discharge nozzle and the outer pipe. The exhaust gases with entrained air were passed to a conventional Briggs and Stratton muffler which had been modified by the addition of a coating of a platinum catalyst to the internal baffle plate surfaces to ignite and stabilize thermal reactions in the muffler and by addition of fixed swirler vanes opposite the muffler inlet. Reacted effluent from the muffler was passed through a second nozzle into a venturi duct to entrain additional air to dilute and cool the effluent. Thermal reaction of the fuel values in the exhaust gases with the oxygen in the inducted air resulted in a muffler exhaust temperature at the muffler exit of 923 degrees Kelvin, or about 200 degrees Kelvin higher than the 718 degrees Kelvin exhaust temperature of a noncatalytic muffler at the same operating conditions. The diluted exhaust was reduced from 923 degrees Kelvin to 713 degrees Kelvin or slightly lower than the exhaust temperature for the standard muffler at the same engine operating conditions. Integrating the venturi duct into a full surrounding sheet metal muffler heat shield through which engine cooling air is ducted resulted in external surface temperatures below 550 degrees Kelvin and an exhaust gas temperature below 610 degrees Kelvin, i.e. much lower than that of the standard non-catalytic muffler. Thus, not only were emissions controlled with a simple system but exhaust and surface temperatures were below those for an engine without emissions control.

What is claimed is:

1. An emissions control system for minimizing hazards associated with the heat generated in exhaust from a rich burn internal combustion engine, said control system comprising:
   a. a reaction chamber for oxidation of exhaust gas fuel values, connected to the engine to receive a flow of the exhaust gas;
   b. first passive means to utilize the exhaust flow energy from the engine as the only means for induction of reactive air into the engine exhaust gas,
   c. duct means for transfer of said exhaust gas together with said inducted air into said reaction chamber;
   d. duct means to transfer effluent gases from the reaction chamber;
   e. second passive means to utilize the reaction chamber effluent flow energy to mix cooling air into reaction chamber effluent to lower the temperature of said effluent by at least 200 degrees Kelvin; and
   f. flame arrestor means on the first and second passive means to prevent ignition of flammable fuel-air mixtures external to the engine.

2. The system of claim 1 wherein said chamber comprises means for inducing effective recirculation of gases flowing through said reaction chamber.

3. The system of claim 2 wherein at least a portion of the internal walls of said reaction chamber comprise a catalyst to stabilize thermal combustion.

4. The system of claim 1 in which said reaction chamber is designed to operate at a temperature in excess of 800 degrees Kelvin and includes insulation means to reduce external surface temperatures.

5. The system of claim 1 wherein said reaction chamber is within the engine muffler.

6. The system of claim 1 wherein said reaction chamber includes an external heat shield.

7. The system of claim 6 wherein the flow outlet of said passive air mixing means is positioned such as to minimize direct impingement of the effluent flow against the walls of said heat shield.

8. The method of controlling carbon monoxide and hydrocarbon emissions from rich burn internal combustion engines comprising the steps of:
   a. passing the exhaust gas through a first nozzle to provide a first gas jet,
   b. passing said first gas jet into the open end of a first flow duct having a flame arrestor thereon thereby inducting air through a flame arrestor into said duct with said exhaust gas to provide an admixture for reaction,
   c. reacting the carbon monoxide and hydrocarbons in the exhaust gas with oxygen to produce carbon dioxide, water and heat,
   d. passing the resulting heated reaction product gases through a second nozzle to provide a second gas jet, and
   e. passing said second gas jet into a second flow duct having a flame arrestor mounted thereon thereby inducting cooling air through the flame arrestor into admixture with said hot product gases.

9. The method of claim 8 wherein said reaction is a gas phase thermal reaction.

10. The method of claim 8 wherein said reaction occurs on the surface of a catalyst.

11. The method of claim 8 wherein said reaction is a gas phase reaction stabilized by contact of said reactants with a catalytic surface.

12. The method of claim 8 wherein said admixture temperature is no higher than the temperature of said exhaust gas.

13. The method of claim 8 wherein said admixture temperature is no higher than 600 degrees Kelvin.

14. The method of claim 10 wherein said catalyst comprises a platinum group metal.

* * * * *